US007761540B2

(12) United States Patent
Marks et al.

(10) Patent No.: US 7,761,540 B2
(45) Date of Patent: Jul. 20, 2010

(54) SYSTEM AND METHOD FOR AUTOMATED REMOTE BOOTING IN A SERIAL ATTACHED SCSI ENVIRONMENT

(75) Inventors: Kevin T. Marks, Round Rock, TX (US); Ahmad H. Tawil, Round Rock, TX (US)

(73) Assignee: Dell Products L.P., Round Rock, TX (US)

( * ) Notice: Subject to any disclaimer, the term of this patent is extended or adjusted under 35 U.S.C. 154(b) by 805 days.

(21) Appl. No.: 11/581,997

(22) Filed: Oct. 17, 2006

(65) Prior Publication Data

US 2008/0091933 A1    Apr. 17, 2008

(51) Int. Cl.
 *G06F 15/177*    (2006.01)
(52) U.S. Cl. ........................... 709/222; 709/220
(58) Field of Classification Search .......... 709/220–222
 See application file for complete search history.

(56) References Cited

U.S. PATENT DOCUMENTS

| | | | | |
|---|---|---|---|---|
| 6,158,002 A * | 12/2000 | Kwan et al. | ..................... | 713/2 |
| 6,177,860 B1 * | 1/2001 | Cromer et al. | ............. | 340/10.1 |
| 6,421,777 B1 | 7/2002 | Pierre-Louis et al. | | |
| 6,732,166 B1 * | 5/2004 | Woodruff | ..................... | 709/221 |
| 2003/0126242 A1 | 7/2003 | Chang | | |
| 2004/0030953 A1 * | 2/2004 | Sun et al. | ....................... | 714/10 |
| 2004/0098715 A1 * | 5/2004 | Aghera et al. | ............... | 717/173 |
| 2005/0253722 A1 * | 11/2005 | Droms et al. | ............ | 340/572.1 |
| 2006/0224826 A1 * | 10/2006 | Arai et al. | ................... | 711/114 |
| 2007/0239978 A1 * | 10/2007 | Bharathy et al. | ............... | 713/2 |

OTHER PUBLICATIONS

Liao et al., SAS-2 Zoning, T10 Document 05-144r5, Aug. 15, 2005, pp. 1-3, available at http://www.t10.org/ftp/t10/document.05/05-144r5.pdf.
Brisse et al., Understanding Boof-from-SAN Technology, Dell White Paper, Sep. 2005, available at http://www.dell.com/downloads/global/vectors/2005_bfs.pdf.

* cited by examiner

*Primary Examiner*—Hussein A. Elchanti
(74) *Attorney, Agent, or Firm*—Baker Botts L.L.P.

(57) ABSTRACT

A system and method is disclosed for identifying the boot targets for an initiator port in point-to-point network, such as a Serial Attached SCSI network. In operation, the initiator port issues a command to an expander that is directly coupled to the initiator port. In response the expander identifies the expander of the network that includes a boot table that identifies the boot addresses associated with each of the initiator port. The boot addresses associated with the initiator port are returned to the initiator port in a ranked order, and the initiator port attempts to boot from the boot address locations until the initiator port successfully boots.

17 Claims, 9 Drawing Sheets

FIG. 1

| BYTE\BIT | 7 | 6 | 5 | 4 | 3 | 2 | 1 | 0 |
|---|---|---|---|---|---|---|---|---|
| 0 | SMP FRAME TYPE (40h) | | | | | | | |
| 1 | FUNCTION (A1h*) | | | | | | | |
| 2 | Reserved | | | | | | | |
| 3 | | | | | | | | |
| 4 | INITIATOR SAS ADDRESS | | | | | | | |
| 11 | | | | | | | | |
| 12 | Reserved | | | | | | | |
| 14 | | | | | | | | |
| 15 | Reserved | | | | | CLEAR TABLE | REMOVE | BEV |
| 16 | (MSB) BOOT ENTRY 0 TARGET SAS ADDRESS | | | | | | | |
| 23 | | | | | | | | (LSB) |
| 24 | (MSB) BOOT ENTRY 0 LUN | | | | | | | |
| 31 | | | | | | | | (LSB) |
| 32 | (MSB) BOOT ENTRY 1 TARGET SAS ADDRESS | | | | | | | |
| 39 | | | | | | | | (LSB) |
| 40 | (MSB) BOOT ENTRY 1 LUN | | | | | | | |
| 49 | | | | | | | | (LSB) |
| 48 | (MSB) BOOT ENTRY 2 TARGET SAS ADDRESS | | | | | | | |
| 55 | | | | | | | | (LSB) |
| 56 | (MSB) BOOT ENTRY 2 LUN | | | | | | | |
| 63 | | | | | | | | (LSB) |
| 64 | (MSB) BOOT ENTRY 3 TARGET SAS ADDRESS | | | | | | | |
| 71 | | | | | | | | (LSB) |
| 72 | (MSB) BOOT ENTRY 3 LUN | | | | | | | |
| 79 | | | | | | | | (LSB) |
| 80 | (MSB) CRC | | | | | | | |
| 83 | | | | | | | | (LSB) |

FIG. 2

| SAS Initiator port address (SAS Address)* | BEV | TBSA0 | LUN0 | TBSA1 | LUN1 | TBSA2 | LUN2 | TBSA3 | LUN3 |
|---|---|---|---|---|---|---|---|---|---|
| 0002 | 1 | 1256 | 0 | 0251 | 5 | NV | NV | NV | NV |
| 0021 | 0 | 1256 | 1 | NV | NV | NV | NV | NV | NV |
| 0156 | 3 | 1256 | 2 | 0652 | 0 | 5110 | 1 | 1245 | 10 |
| ... | | | | | | | | | |
| ... | | | | | | | | | |
| ... | | | | | | | | | |
| 7652 | 2 | 0652 | 3 | 1256 | 7 | 5101 | 2 | NV | NV |

| BYTE\BIT | 7 | 6 | 5 | 4 | 3 | 2 | 1 | 0 |
|---|---|---|---|---|---|---|---|---|
| 0 | \multicolumn{8}{c|}{SMP FRAME TYPE (41h)} |
| 1 | \multicolumn{8}{c|}{FUNCTION (83h*)} |
| 2 | \multicolumn{8}{c|}{FUNCTION RESULT} |
| 3 | \multicolumn{8}{c|}{Reserved} |
| 4 | | | | | | | | |
| 6 | \multicolumn{8}{c|}{Reserved} |
| 7 | \multicolumn{6}{c|}{Reserved} | | BEV |
| 8 | (MSB) | | | | | | | |
| 15 | \multicolumn{8}{c|}{BOOT ENTRY 0 TARGET SAS ADDRESS (LSB)} |
| 16 | (MSB) | | | | | | | |
| 23 | \multicolumn{8}{c|}{BOOT ENTRY 0 LUN (LSB)} |
| 24 | (MSB) | | | | | | | |
| 31 | \multicolumn{8}{c|}{BOOT ENTRY 1 TARGET SAS ADDRESS (LSB)} |
| 32 | (MSB) | | | | | | | |
| 39 | \multicolumn{8}{c|}{BOOT ENTRY 1 LUN (LSB)} |
| 40 | (MSB) | | | | | | | |
| 47 | \multicolumn{8}{c|}{BOOT ENTRY 2 TARGET SAS ADDRESS (LSB)} |
| 48 | (MSB) | | | | | | | |
| 55 | \multicolumn{8}{c|}{BOOT ENTRY 2 LUN (LSB)} |
| 56 | (MSB) | | | | | | | |
| 63 | \multicolumn{8}{c|}{BOOT ENTRY 3 TARGET SAS ADDRESS (LSB)} |
| 64 | (MSB) | | | | | | | |
| 71 | \multicolumn{8}{c|}{BOOT ENTRY 3 LUN (LSB)} |
| 72 | (MSB) | | | | | | | |
| 75 | \multicolumn{8}{c|}{CRC (LSB)} |

SYSTEM AND METHOD FOR AUTOMATED REMOTE BOOTING IN A SERIAL ATTACHED SCSI ENVIRONMENT

TECHNICAL FIELD

The present disclosure relates generally to computer systems and information handling systems, and, more particularly, to a system and method for remote automated booting in a Serial Attached SCSI (SAS) environment.

BACKGROUND

As the value and use of information continues to increase, individuals and businesses seek additional ways to process and store information. One option available to these users is an information handling system. An information handling system generally processes, compiles, stores, and/or communicates information or data for business, personal, or other purposes thereby allowing users to take advantage of the value of the information. Because technology and information handling needs and requirements vary between different users or applications, information handling systems may vary with respect to the type of information handled; the methods for handling the information; the methods for processing, storing or communicating the information; the amount of information processed, stored, or communicated; and the speed and efficiency with which the information is processed, stored, or communicated. The variations in information handling systems allow for information handling systems to be general or configured for a specific user or specific use such as financial transaction processing, airline reservations, enterprise data storage, or global communications. In addition, information handling systems may include or comprise a variety of hardware and software components that may be configured to process, store, and communicate information and may include one or more computer systems, data storage systems, and networking systems.

Information handling systems may be included as elements of a storage network. A storage network can be considered as a specialized network of storage devices coupled to one or more data servers. A storage network may include a number of storage elements or storage drives. Storage drives typically comprise disk-based storage drives. Serial Attached SCSI (SAS) is a storage network interface and communications protocol for storage transactions. SAS storage networks are characterized as having a serial, point-to-point architecture and improved data integrity, as compared with parallel SCSI storage networks. One difficulty of a SAS storage network is providing for the remote boot of a server or host through the storage resources of the SAS storage network. Enabling a remote boot from the storage resources of the SAS storage network often involves identifying to the host bus adapter the target address and logical unit number (LUN) of the boot target in the SAS storage network. In addition, the boot BIOS of the host may have to be enabled or configured to allow for the remote boot of the host. The process of enabling a remote boot of a host through a target of the SAS storage network is laborious, time-consuming, and prone to errors and is not easily adaptable to dynamic provisioning environments.

SUMMARY

In accordance with the present disclosure, a system and method is disclosed for identifying the boot targets for an initiator port in point-to-point network, such as a Serial Attached SCSI network. In operation, the initiator port issues a command to an expander that is directly coupled to the initiator port. In response the expander identifies the expander of the network that includes a boot table that identifies the boot addresses associated with each of the initiator port. The boot addresses associated with the initiator port are returned to the initiator port in a ranked order, and the initiator port attempts to boot from the boot address locations until the initiator port successfully boots.

The system and method disclosed herein is technically advantageous because it provides a system and method for identifying boot address for initiator ports within a Serial Attached SCSI network. As a result, each initiator port is able to retrieve the boot targets associated with the initiator port. Another technical advantage of the system and method disclosed herein is that each initiator port can be associated with multiple boot targets, thereby enabling the initiator port to boot from one of several boot targets that are provided to the initiator port in a ranked list. Other technical advantages will be apparent to those of ordinary skill in the art in view of the following specification, claims, and drawings.

BRIEF DESCRIPTION OF THE DRAWINGS

A more complete understanding of the present embodiments and advantages thereof may be acquired by referring to the following description taken in conjunction with the accompanying drawings, in which like reference numbers indicate like features, and wherein.

DETAILED DESCRIPTION

For purposes of this disclosure, an information handling system may include any instrumentality or aggregate of instrumentalities operable to compute, classify, process, transmit, receive, retrieve, originate, switch, store, display, manifest, detect, record, reproduce, handle, or utilize any form of information, intelligence, or data for business, scientific, control, or other purposes. For example, an information handling system may be a personal computer, a network storage device, or any other suitable device and may vary in size, shape, performance, functionality, and price. The information handling system may include random access memory (RAM), one or more processing resources such as a central processing unit (CPU) or hardware or software control logic, ROM, and/or other types of nonvolatile memory. Additional components of the information handling system may include one or more disk drives, one or more network ports for communication with external devices as well as various input and output (I/O) devices, such as a keyboard, a mouse, and a video display. The information handling system may also include one or more buses operable to transmit communications between the various hardware components.

Figure 1:
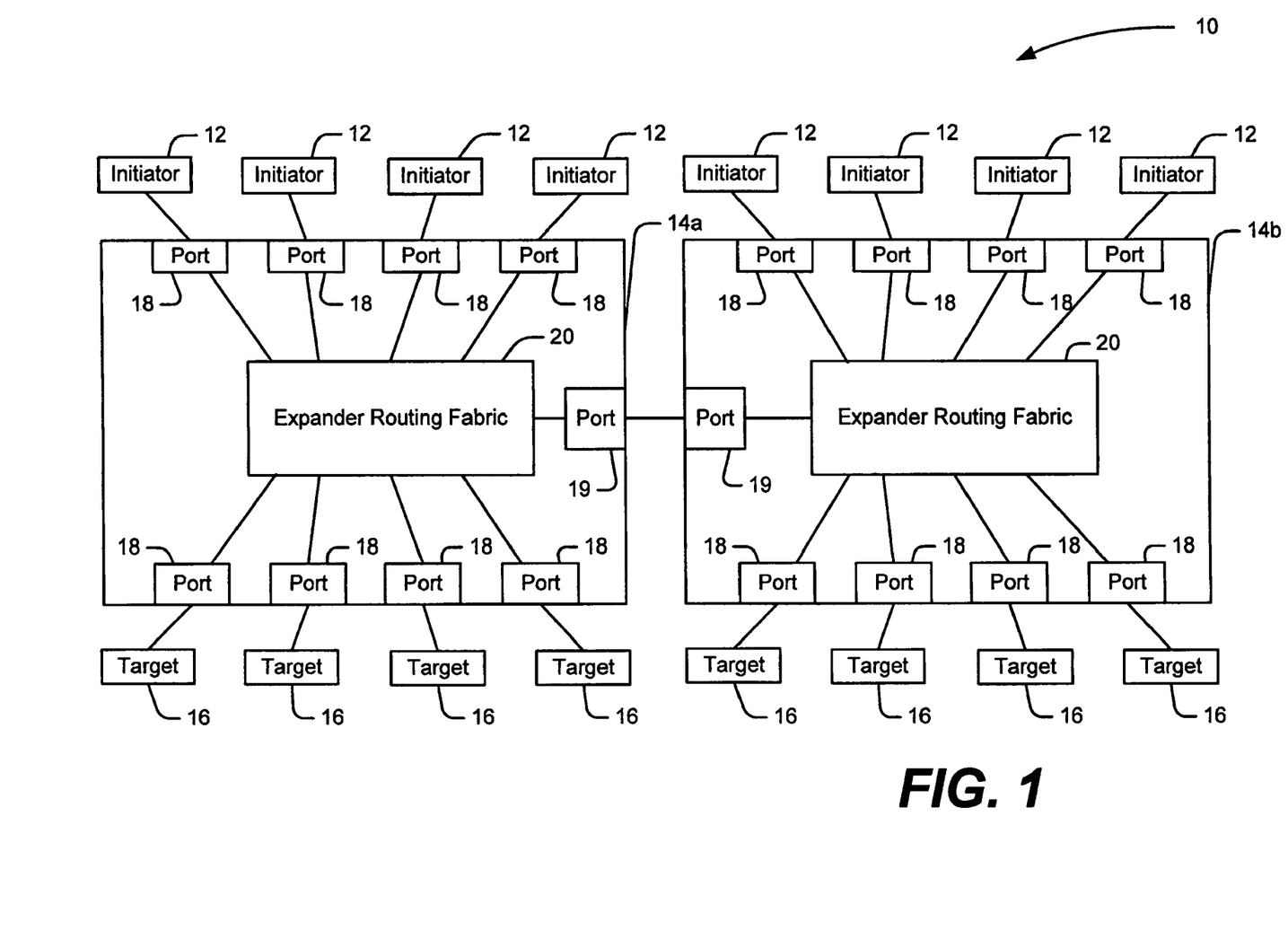
FIG. 1 is a diagram of a Serial Attached SCSI network.

Shown in FIG. 1 is a diagram of an SAS network, which is indicated generally at 10. The domain of network 10 includes expanders 14a and 14b. In the example of FIG. 1, expanders 14a and 14b include a number of expander ports 18. Each expander port 18 of expanders 14a and 14b are coupled to an SAS initiator port 12 or an SAS target port 16. Expander 14 also includes an expander routing fabric 20, which represents the point-to-point connections between the expander ports coupled to SAS initiators and expander ports coupled to SAS targets. Expanders 14 are coupled to each other through ports 19.

The method of remotely booting a host in an SAS storage environment involves boot manager phys, boot manager expanders, and boot managing expanders. In a SAS storage environment, a phy is defined as each endpoint of a transmitter-receiver (transceiver) pair. Each phy is defined to include a boot manager bit as part of its descriptive properties. If the boot manager bit for a phy is set to a logical 1, and if the phy comprises an end device, such as an initiator port, the phy is known as a boot manager phy. A single domain may include multiple boot manager phys. A change to a boot sequence can only be initiated by a boot manager phy. A boot manager expander is an expander that is capable of receiving commands to modify the boot sequence of an initiator that is coupled to a host. A boot manager expander is capable of propagating commands concerning modifications to the boot sequence to other expanders in the domain. A single domain may include multiple boot manager expanders. A boot managing expander is a boot manager expander that is designated as the only boot manager expander in the domain that is permitted to accept modifications to the boot sequence of a host from a boot manager phy. The boot managing expander is selected from the set of boot manager expanders. The boot managing expander is responsible for propagating modifications to the boot sequence of a host to other boot manager expanders in the domain.

Figure 2:
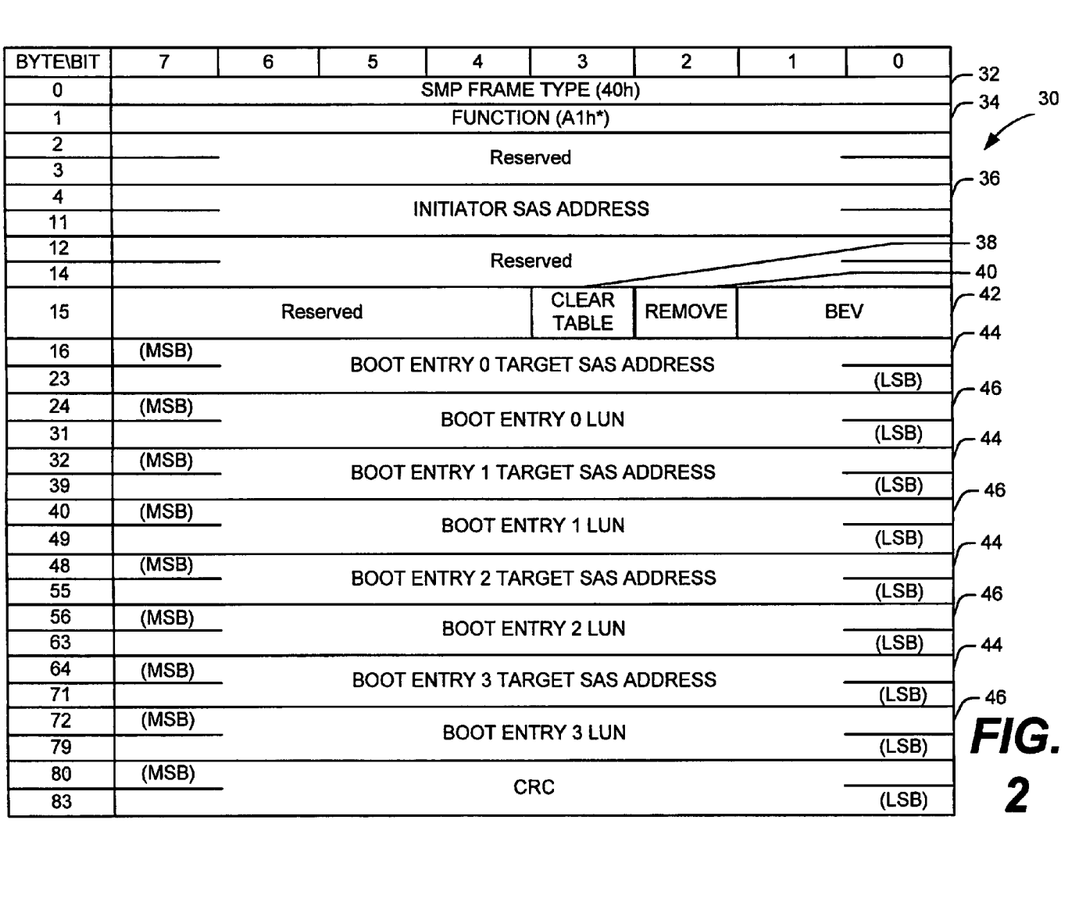
FIG. 2 is a diagram of the data structure of the CONFIGURE BOOT TARGETS command.

In operation, if the boot manager bit of an initiator port is set to a logical 1, a boot managing expander coupled to that initiator port can receive commands from the initiator port to modify the remote boot sequence of a host. Changes to the boot sequence of a host are made through the SAS Management Protocol (SMP) command CONFIGURE BOOT TARGETS. Shown in FIG. 2 is the structure of the CONFIGURE BOOT TARGETS command, which is indicated generally at 30. Data structure 30 includes an SMP Frame Type field 32, which is set to 40h to indicate that the data structure is an SMP request frame as defined within the SAS protocol. Function field 34 is set to A0h, which is the next available function code within the SMP command structure. Alternatively, Function field 34 could be set to a vendor-defined value in the range of C0h-FFh. The address of the SAS initiator port that is the subject of the CONFIGURE BOOT TARGETS command is shown at 36 as the INITIATOR SAS ADDRESS field. The CLEAR TABLE bit at 38 is set to a logical 1 to clear the entire expander boot table. If the CLEAR TABLE bit is set to a logical 1, the fields following the CLEAR TABLE bit are ignored. The REMOVE bit at 40 is set to a logical 1 to remove the SAS initiator identified in the INITIATOR SAS ADDRESS field at 36 from the expander boot table. If the REMOVE bit is set to a logical 1, the fields following the REMOVE bit are ignored.

The BEV (boot entry valid) field 42 includes a numerical value between zero and three, inclusive, that identifies the number of valid boot entries plus one that follow in the CONFIGURE BOOT TARGETS command. If the BEV field is set to two, for example, three boot entries follow. Each boot entry includes a BOOT ENTRY TARGET SAS ADDRESS field 44 and a BOOT ENTRY LUN field 46. The BOOT ENTRY TARGET SAS ADDRESS field includes the target SAS address, and the BOOT ENTRY LUN field identifies the boot logical unit number (LUN) of the target device associated with the target SAS address. The order of the boot entries in the CONFIGURE BOOT TARGETS command corresponds to the order of the targets in the boot order. Boot Entry 0 has the highest priority among the boot entries and Boot Entry 3 has the lowest priority among the boot entries. Each SAS initiator can have as many as four targets from which to boot, with each target identified by its SAS address and LUN.

Figure 3:
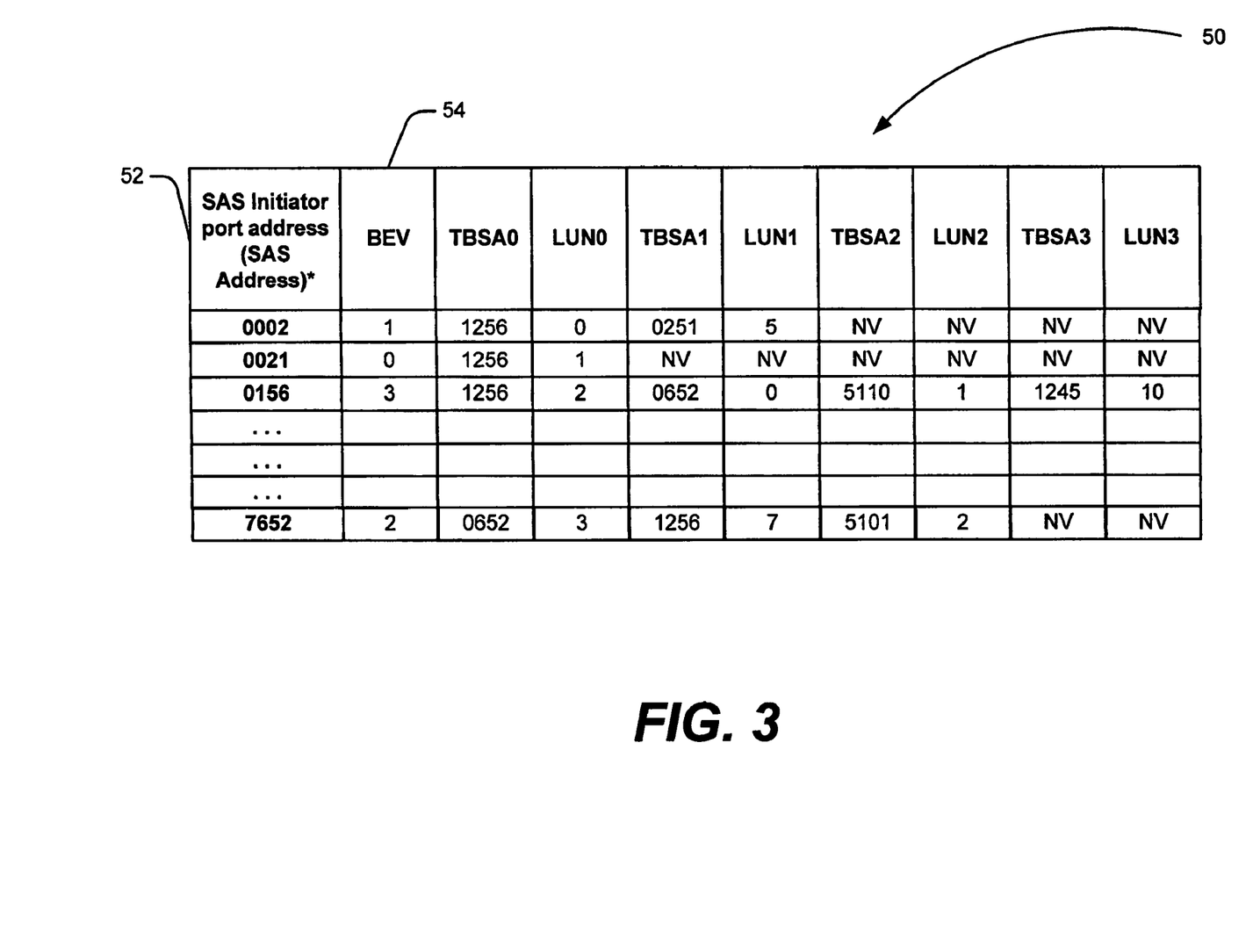
FIG. 3 is a diagram of a boot table.

Each boot manager expander in the domain within the SAS network includes a boot table. The boot managing expander is responsible for replicating the boot table to the boot manager expanders within the network. The boot table is saved to local memory in each boot manager expander within the network. Changes to the boot table are always made through the boot managing expander, which transmits the modifications to the boot manager expanders in the SAS network. An example of a boot table 50 is shown in FIG. 3. The far left column of the boot table is the SAS initiator port address field 52. Although SAS addresses are usually specified as eight-byte addresses, the addresses of the example of FIG. 3 are shown for the sake of simplicity as being two-byte addresses. The column to the right of the SAS initiator port address field 52 is the BEV field 54. For each SAS initiator port address field, the BEV field identifies the number of valid boot entries plus one that follow. Following the BEV field are the boot entries for each SAS initiator port address. The boot entry includes the target boot address and the LUN of each boot location associated with each SAS initiator port address. The designation "NV" indicates that a boot entry is not valid for the SAS initiator port address. For example, for the first row, the BEV field is one, indicating that boot entries in the "0" position and the "1" position follow. Thus, a target boot address and a LUN address is included for boot entry 0 and boot entry 1, and the designation "NV" is included for each of boot entry 2, and boot entry 3 in the first row. Similarly, the third row (having SAS port initiator address 0156) has a BEV value of 3, which indicates that the boot entries are valid for each of boot entry 0, boot entry 1, boot entry 2, and boot entry 3.

Figure 5:
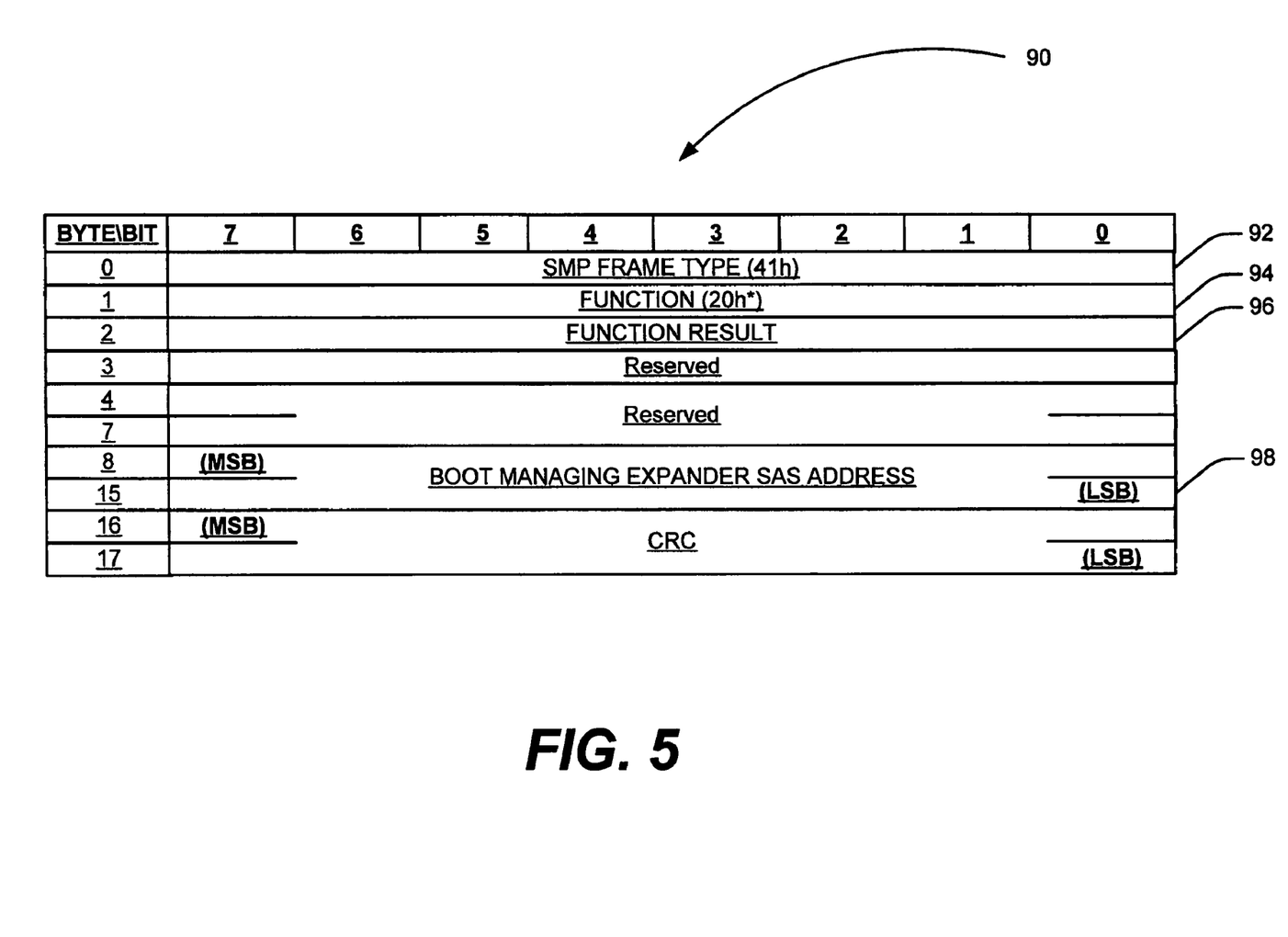
FIG. 5 is a diagram of the data structure of the SMP REPORT BOOT MANAGER response.

In a domain comprised of a SAS network with self-configuring expanders, during a standard configuration process, the self-configuring expanders of the domain will designate the expander device with the highest SAS address as the boot managing expander. Each boot manager expander sets the address of the boot managing expander for responding in the SMP REPORT BOOT MANAGER data structure, which is shown in FIG. 5. As part of the change notification process defined in SAS, if the boot managing expander disappears, a BROADCAST (Change) is generated, and a new boot managing expander will be selected with the newest highest SAS address.

Figure 4:
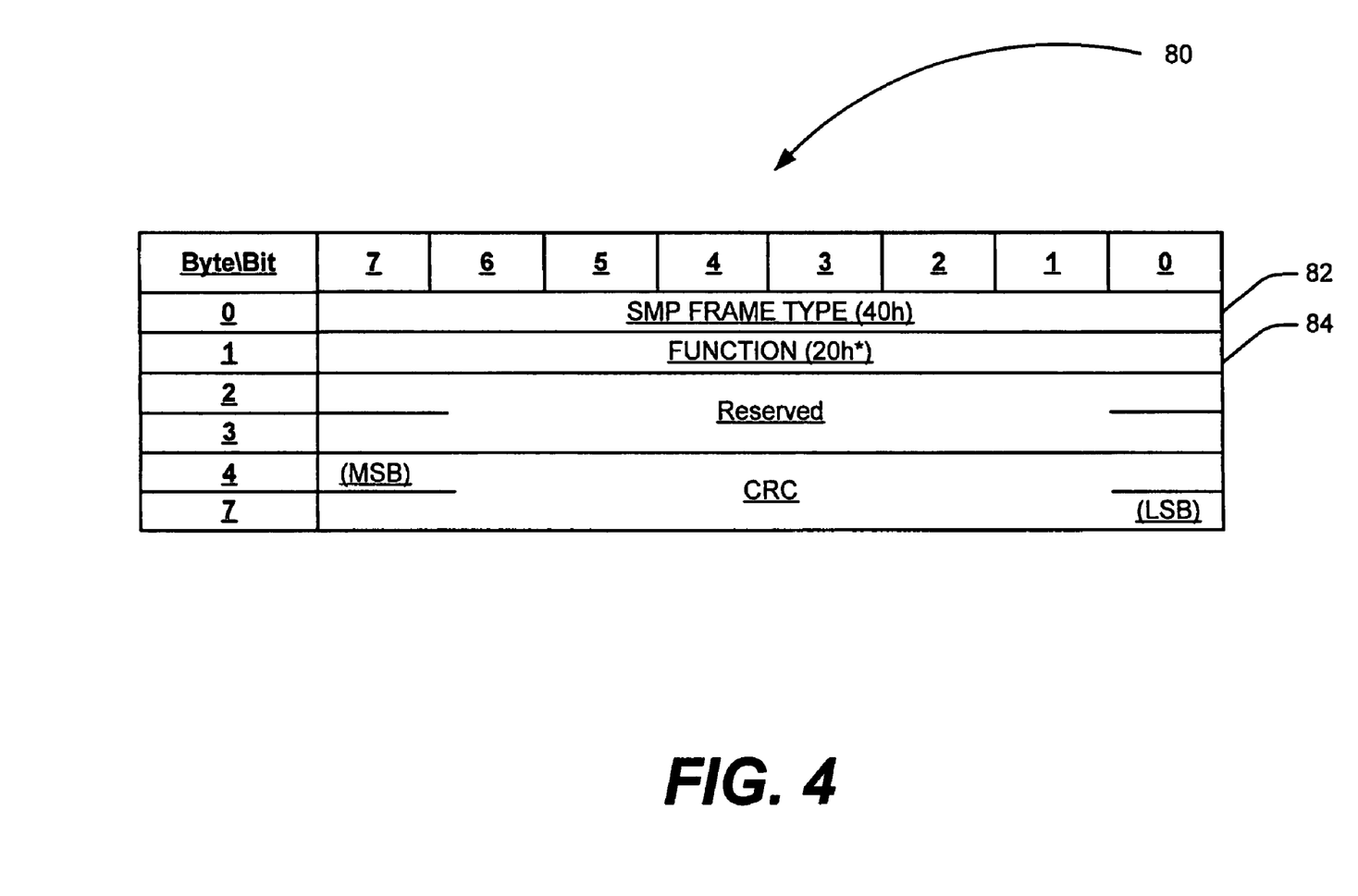
FIG. 4 is a diagram of the data structure for an SMP REPORT BOOT MANAGER request.

An example of the data structure for an SMP REPORT BOOT MANAGER request is shown in FIG. 4. Data structure 80 includes an SMP Frame Type field 82, which is set to the value 40h to indicate that the data structure is an SMP request frame as defined within the SAS protocol. Function field 84 is set to 20h, which is the next available general SMP input function code. Alternatively, Function field 84 could be set to a vendor-specific code in the range of 40-7Fh. An example of an SMP REPORT BOOT MANAGER response data structure is shown at 90 in FIG. 5. An SMP Frame Type field, which is shown at 92, is set to 41h to indicate an SMP response frame, as defined within the SAS protocol. Function field 94 is set to 20h, which is the next available SMP input function code. Alternatively, Function field 94 could be set to a vendor-specific code in the range of 40h-7Fh. The Function Result field 96 includes the result of the SMP command. All fields following the Function Result field 96 are ignored (with the exception of the CRC field) if the Function Result field is set to anything other than 00h. A setting other than 00h indicates that the function has failed and that the expander does not support providing boot target information. The BOOT MANAGING EXPANDER SAS ADDRESS field 98 contains the SAS address of the current boot managing expander.

Figure 6:
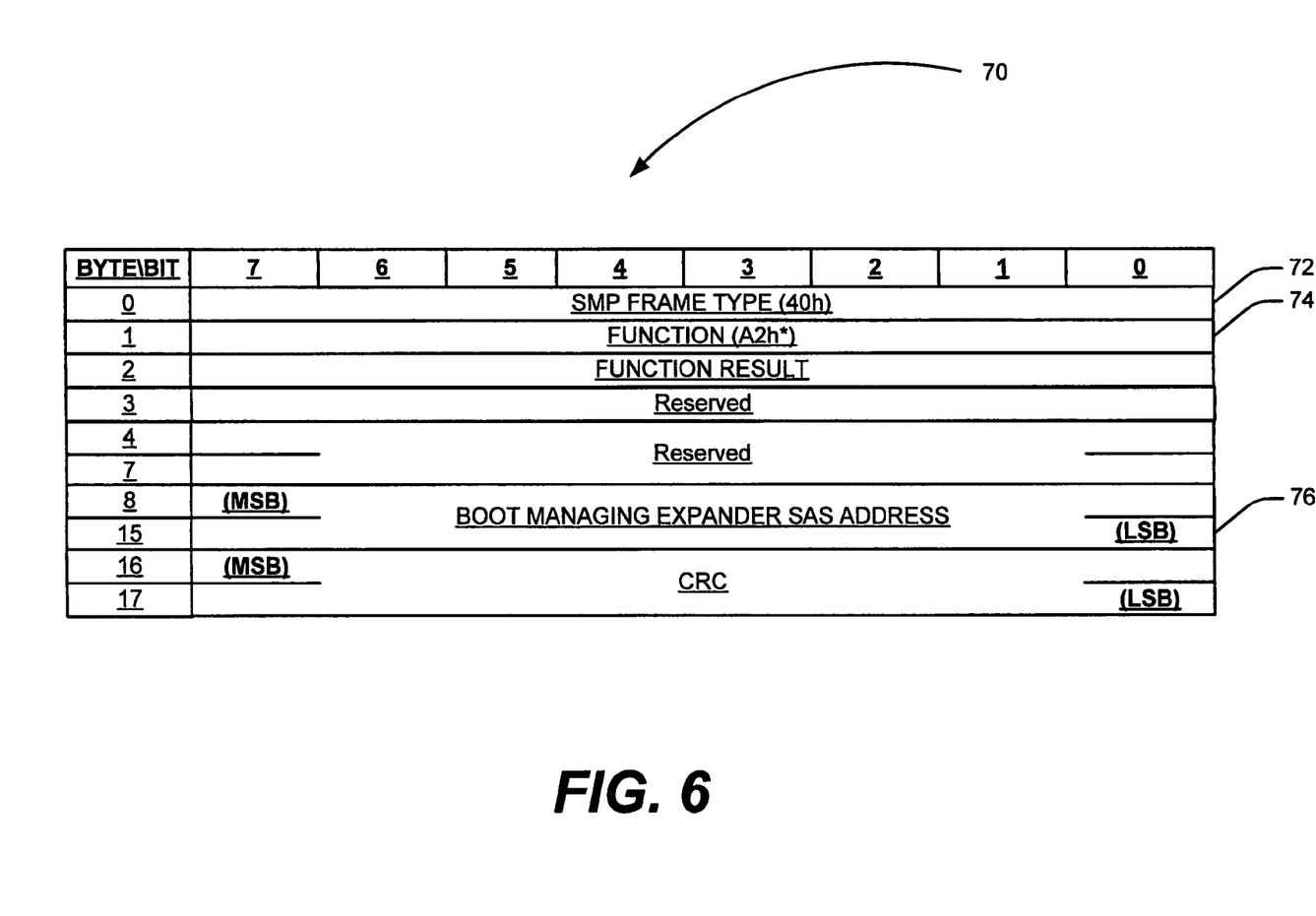
FIG. 6 is a diagram of the data structure of the SMP CONFIGURE BOOT MANAGER request.

If the domain is not comprised of self-configuring expanders, then the boot manager or boot managers that are attached to the SAS domain (as indicated by the boot manager phy that is set to logical one) are responsible for identifying the boot manager expander with the highest SAS address and using the SMP CONFIGURE BOOT MANAGER request, as shown in FIG. 6, to set the address of the boot managing expander for each boot manager expander. A boot manager expander whose boot manager expander SAS address is the same as its expander address knows that it is the boot managing expander and is responsible for replicating changes from the boot table to the other boot manager expanders.

Shown in FIG. 6 is the data structure of the SMP CONFIGURE BOOT MANAGER command, which is indicated generally at 70. Data structure 70 includes an SMP Frame Type field 72, which is set to 40h to indicate that the data structure is an SMP request frame as defined within the SAS protocol. Function field 74 is set to A2h, which is the next available function code within the SMP command structure. Alternatively, Function field 74 could be set to a vendor-defined value in the range of C0h-FFh. The address of the boot managing expander that is the subject of the CONFIGURE BOOT MANAGER command is shown at 76 as the BOOT MANAGING EXPANDER SAS ADDRESS field.

Figure 7:
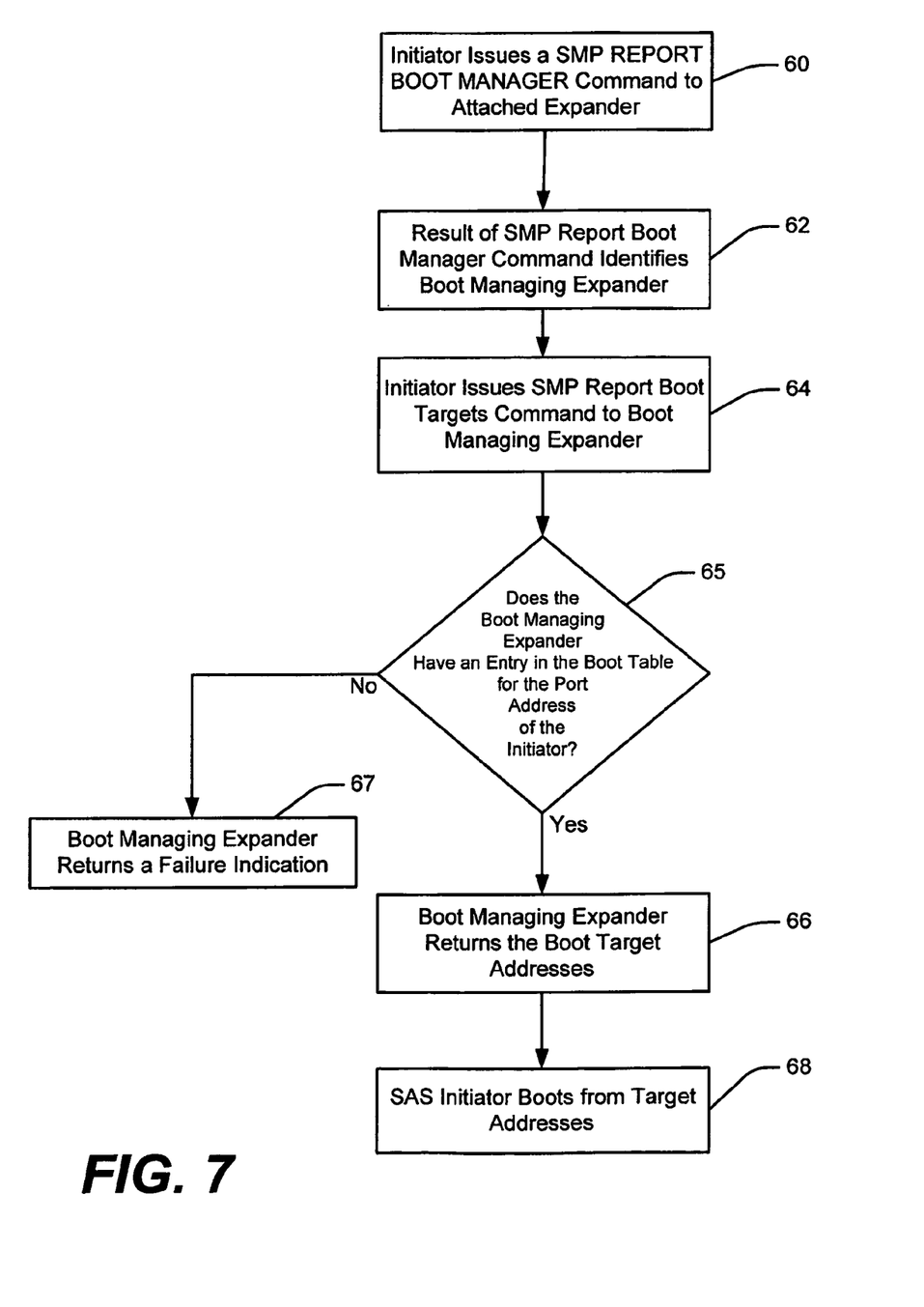
FIG. 7 is a flow diagram of an initiator boot process.
Figure 8:
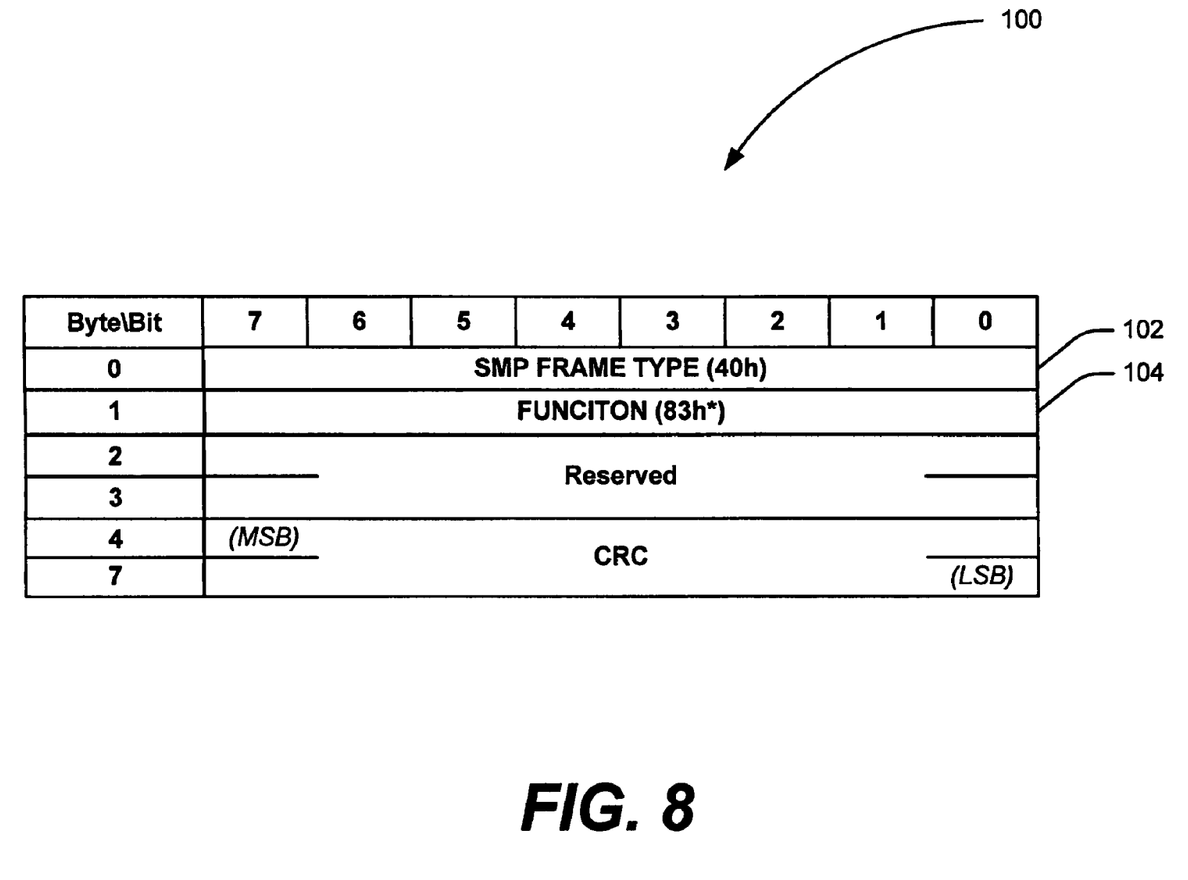
FIG. 8 is a diagram of the data structure of the SMP REPORT BOOT TARGETS request.

A flow diagram of an initiator boot process is shown in FIG. 7. During an initiator boot process, the SAS initiator will follow a standard SAS-based discover algorithm to identify the SAS domain of the initiator. The initiator will then issue at step 60 an SMP REPORT BOOT MANAGER command to the expander to which it is directly attached in the domain. The result of the SMP REPORT BOOT MANAGER, which is received at step 62, identifies the boot managing expander to the initiator. Following the identification of the boot managing expander, the initiator issues an SMP REPORT BOOT TARGETS request at step 64 to the boot managing expander. An example of the data structure for an SMP REPORT BOOT TARGETS request is shown in FIG. 8. Data structure 100 includes an SMP Frame Type field 102, which is set to the value 40h to indicate that the data structure is an SMP request frame as defined within the SAS protocol. The Function field 104 is set to 83h, which is the next available SMP output function code. Alternatively, Function field 104 could be set to a vendor-specific code in the range of C0h-FFh.

Following the issuance of the SMP REPORT BOOT TARGETS request at step 64, the boot managing expander receives the request and determines at step 65 if the boot managing expander has an entry in its boot table for the port address of the initiator. If the boot managing expander does not have an entry in the boot table for the port address of the initiator, the boot managing expander returns a failure indication at step 67. If it is determined at step 65 that the boot managing expander has an entry in the boot table for the port address of the initiator, the boot managing expander at step 66 returns the boot target addresses and the associated LUNs to the initiator. The response is returned to the initiator in the form of the SMP REPORT BOOT TARGETS response data structure of FIG. 9. The number of boot target addresses and associated LUNs returned to the initiator depends on the value included in the BEV field in the boot table (see FIG. 3). As described, if the boot table includes an entry for the port address of the initiator, the number of entries could be as few as one or as many as four.

Figure 9:
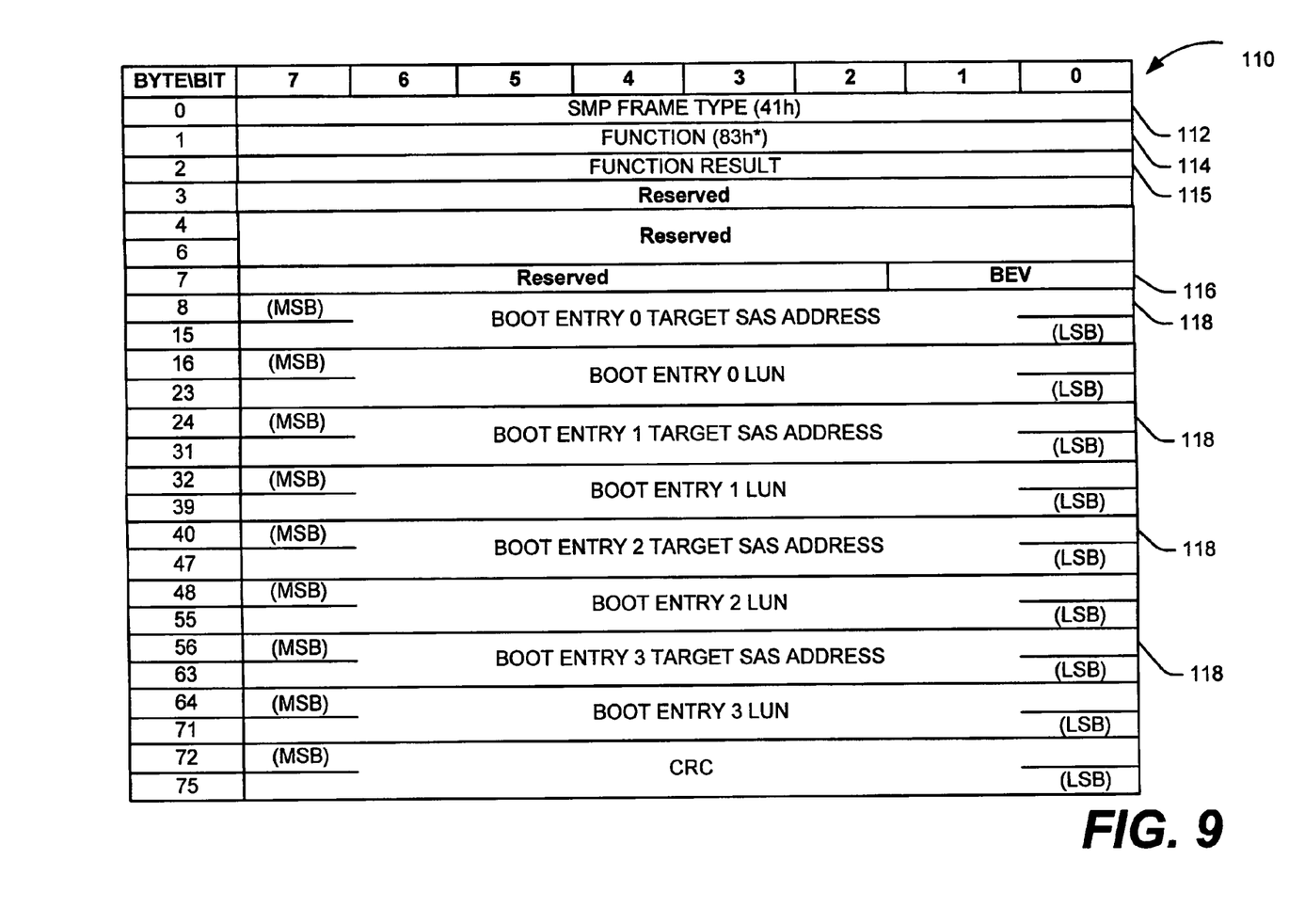
FIG. 9 is a diagram of the data structure of the SNIP REPORT BOOT TARGETS response.

An example of an SMP REPORT BOOT TARGETS response data structure is shown at 110 in FIG. 9. An SMP Frame Type field, which is shown at 112, is set to 41h to indicate an SMP response frame; as defined within the SAS protocol. The Function field 114 is set to 83h, which is the next available SMP output function code. Alternatively, Function field 114 could be set to a vendor-specific code in the range of C0h-FFh. The Function Result field 115 includes the result of the SMP command. All fields following the Function Result field 115 are ignored (with the exception of the CRC field) if the Function Result field is set to anything other than 00h. A setting other than 00h indicates that the function has failed and that no boot targets are associated with the initiator. The BEV (boot entry valid) field 116 identifies the number of boot entries that follow in the table. In the example of FIG. 9, as many as four boot entries follow. Each boot entry 118 includes a target SAS address and the boot LUN of the target device. Following the receipt of the report boot targets data structure, the initiator next attempts to boot from the target addresses identified in the table (step 68). The initiator first attempts to boot from the first listed entry. If the attempted boot from the first listed entry fails (e.g. an OPEN_REJECT (NO DESTINATION) primitive is received), the initiator will attempt to boot from the next following entry until the initiator successfully boots. If the server is not able to boot from any of the target addresses, the initiator could, as a default option, boot from an internal hard drive on the initiator.

Although the system and method disclosed herein has been described with reference to SAS networks, the system and method disclosed herein could be used with any network having a discovery procedure and a point-to-point architecture. It should also be recognized that the system and method disclosed herein need not be implemented with the command set disclosed herein. Rather, the system and method disclosed herein may be employed with any command set that is operable to limit the discovery functions of the network on the basis of the ports involved in a configuration sequence. Although the present disclosure has been described in detail, it should be understood that various changes, substitutions, and alterations can be made hereto without departing from the spirit and the scope of the invention as defined by the appended claims.

What is claimed is:

1. A method for performing a boot operation at an initiator port in a Serial Attached SCSI network, comprising:

issuing a boot discovery command at the initiator to identify addresses of boot targets associated with the initiator, wherein the step of issuing the boot discovery command comprises:
  issuing a command to identify an expander responsible for identifying boot targets for initiators; and
  issuing a command to the identified expander to identify the boot addresses associated with the initiator;
receiving the boot discovery command at an expander associated with the initiator;
determining, at an expander associated with the initiator, if the address of the initiator is associated with a boot target;
if it is determined at the expander associated with the initiator that the initiator is associated with the boot target, providing the address of each associated boot target to the initiator; and attempting to boot from each of the boot targets, with the boot code included at the address of each of the boot targets, until the initiator has successfully booted.

2. The method for performing a boot operation at an initiator port of claim 1, wherein the step of determining if the address of the initiator is associated with a boot target comprises accessing a table to determine if the port address is associated with at least one boot target.

3. The method for performing a boot operation at an initiator port of claim 1, further comprising the step of booting from a local drive of the initiator if it is determined that the initiator cannot successfully boot from any of the boot targets identified by the expander.

4. The method for performing a boot operation at an initiator port of claim 1, wherein the initiator is not directly coupled to the expander that identifies the boot address associated with the initiator.

5. The for performing a boot operation at an initiator port of claim 1, wherein the step of determining if the address of the initiator is associated with a boot target comprises the step of determining at a boot managing expander if the address of the initiator is associated with a boot target.

6. The method for performing a boot operation at an initiator port of claim 5, wherein the initiator is not directly coupled to the boot managing expander.

7. The method for performing a boot operation at an initiator port of claim 5, wherein the step of determining if the address of the initiator is associated with a boot target comprises the step of accessing a table at the boot managing expander to determine if the port address of the initiator is associated with at least one boot target.

8. A network, comprising:
a first expander;
a initiator coupled to the first expander;
a second expander coupled to the first expander;
a plurality of boot targets coupled to at least one of the first expander and the second expander, wherein boot code is included at the address of each of the plurality of boot targets;
wherein the second expander includes an identification of the address of each boot target associated with the initiator;
wherein, following a request made by the initiator to the first expander, the address of each boot target associated with the initiator is provided to the initiator, wherein the request comprises:
issuing to the first expander a command to identify at least one of the plurality of boot targets for the initiator; and
issuing to the first expander a command to identify one or more boot addresses associated with the initiator;
wherein the address of each boot target associated with the initiatior is provided to the initiator if an expander associated with the initiator determines that the initiator is associated with at least one of the identified boot targets; and wherein the initiator attempts to boot from each of the plurality of boot targets, with the boot code included at the address of each of the plurality of boot targets, until the initiator has successfully booted.

9. The network of claim 8, wherein the network is a Serial Attached SCSI network.

10. The network of claim 8, wherein the second expander stores the identification of the addresses of the at least one boot target associated with the initiator in a boot table.

11. The network of claim 10, wherein the boot table includes the addresses of multiple boot targets associated with the initiator.

12. The network of claim 11, wherein the initiator is provided the addresses of multiple boot targets in a ranked order.

13. A method for identifying a boot address at an initiator port in a network, comprising:
issuing a boot discovery command to a first expander that is coupled to the initiator port, wherein the step of issuing the boot discovery command comprises:
issuing to the first expander a command to identify boot targets for the initiator port, and
issuing to the first expander a command to identify one or more boot addresses associated with the initiator port;
identifying at an expander associated with the initiator port, on the basis of the address of the initiator, multiple boot targets associated with the initiator port;
if multiple boot targets associated with the initiator port are identified at an expander associated with the initiator port, returning to the initiator port the address of each of the multiple boot targets associated with the initiator port; and
attempting to boot at the initiator, with the boot code included at the address of each of the multiple boot targets, until the initiator has successfully booted.

14. The method for identifying a boot address at an initiator port in a network of claim 13, wherein the network is a Serial Attached SCSI network.

15. The method for identifying a boot address at an initiator port in a network of claim 14, wherein the step of identifying the boot target is performed at a second expander that is communicatively coupled to the first expander.

16. The method for identifying a boot address at an initiator port in a network of claim 15, wherein the second expander includes a boot table that includes an identifier of the boot target associated with the initiator port.

17. The method for identifying a boot address at an initiator port in a network of claim 16, wherein the boot table includes the identifier of multiple boot targets associated with the initiator port.

* * * * *